United States Patent
Jawhari et al.

(10) Patent No.: US 11,896,961 B1
(45) Date of Patent: *Feb. 13, 2024

(54) OPTIMIZATION OF PHOTOCATALYTIC HYDROGEN GENERATION USING AQUEOUS BIO-ALCOHOLS AND PLASMONIC METALS DEPOSITED ON SEMICONDUCTOR COMPOSITE NANOFIBERS

(71) Applicant: Jazan University, Jazan (SA)

(72) Inventors: Ahmed Hussain Jawhari, Jazan (SA); Ibrahim Ali Radini, Jazan (SA); Nazim Hasan, Jazan (SA); Maqsood Ahmad Malik, Jeddah (SA); Katabathini Narasimharao, Jeddah (SA)

(73) Assignee: Jazan University, Jazan (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,407

(22) Filed: Oct. 5, 2023

Related U.S. Application Data

(63) Continuation of application No. 17/948,630, filed on Sep. 20, 2022, now abandoned.

(60) Provisional application No. 63/374,896, filed on Sep. 7, 2022.

(51) Int. Cl.
| | | |
|---|---|---|
| *B01J 27/18* | (2006.01) | |
| *B01J 23/50* | (2006.01) | |
| *B01J 37/34* | (2006.01) | |
| *B01J 37/02* | (2006.01) | |
| *B01J 35/06* | (2006.01) | |
| *B01J 35/00* | (2006.01) | |
| *B01J 23/30* | (2006.01) | |
| *B01J 31/02* | (2006.01) | |
| *B01J 23/42* | (2006.01) | |

(52) U.S. Cl.
CPC .......... *B01J 27/1817* (2013.01); *B01J 23/30* (2013.01); *B01J 23/42* (2013.01); *B01J 23/50* (2013.01); *B01J 31/02* (2013.01); *B01J 35/004* (2013.01); *B01J 35/0013* (2013.01); *B01J 35/0033* (2013.01); *B01J 35/06* (2013.01); *B01J 37/0221* (2013.01); *B01J 37/342* (2013.01); *B01J 37/343* (2013.01); *B01J 37/346* (2013.01)

(58) Field of Classification Search
CPC ........ B01J 27/1817; B01J 23/30; B01J 23/42; B01J 23/50; B01J 31/02; B01J 35/0013; B01J 35/0033; B01J 35/004; B01J 35/06; B01J 37/0221; B01J 37/342; B01J 37/343; B01J 37/346
USPC .... 502/1, 208, 210, 317, 347; 977/700, 762, 977/811

See application file for complete search history.

(56) References Cited

U.S. PATENT DOCUMENTS

| | | | | |
|---|---|---|---|---|
| 2013/0168228 A1* | 7/2013 | Ozin | .......................... | C25B 3/25 977/773 |
| 2016/0077069 A1* | 3/2016 | Kim | .......................... | D01F 9/10 427/126.3 |
| 2016/0334359 A1* | 11/2016 | Kim | ...................... | G01N 27/127 |
| 2018/0305242 A1* | 10/2018 | Ikeda | ......................... | C03C 8/24 |

FOREIGN PATENT DOCUMENTS

| | | | | | |
|---|---|---|---|---|---|
| CN | 104549389 A | * | 4/2015 | ............... | A62D 3/17 |
| CN | 105126885 A | * | 12/2015 | ............ | B01J 27/188 |
| CN | 109289884 A | * | 2/2019 | ............ | A01N 59/16 |
| CN | 110787826 A | * | 2/2020 | ............ | B01J 27/24 |
| CN | 112121830 A | * | 12/2020 | ............ | B01J 27/188 |
| CN | 112958072 A | * | 6/2021 | ............. | B01J 23/30 |

(Continued)

OTHER PUBLICATIONS

Eleni Grilla et al., "Solar photocatalytic abatement of sulfamethoxazole over Ag3PO4/WO3 composites." Applied Catalysis B: Environmental 231, pp. 73-81. (Year: 2018).*

Ahmed Hussain Jawhari et al., "Pt-Ag/Ag3PO4-WO3 nanocomposites for photocatalytic H2 production from bioethanol." Fuel 344, pp. 1-13. (Year: 2023).*

Qingyong Li et al., "Deposition-precipitation preparation of Ag/Ag3PO4/WO3 nanocomposites for efficient Visible-light degradation of rhodamine B under strongly acidic/alkaline conditions." Journal of Colloid and Interface Science 502, pp. 207-216. (Year: 2017).*

Jinsuo Lu et al., "Fabrication of a direct Z-scheme type WO3/Ag3PO4 composite photocatalyst with enhanced visible-light photocatalytic performances." Applied Surface Science 393, pp. 180-190. (Year: 2017).*

Huixian Shi et al., "Fabrication of Ag/Ag3PO4/WO3 ternary nanoparticles as superior photocatalyst for phenol degradation under visible light irradiation." Solid State Sciences 96, pp. 1-9. (Year: 2019).*

(Continued)

*Primary Examiner* — Patricia L. Hailey
(74) *Attorney, Agent, or Firm* — Ergenzinger IP Law; Edward Ergenzinger

(57) ABSTRACT

The present invention combines the advantages of fabrication of semiconductor heterostructure ($Ag_3PO_4$—$WO_3$) with plasmonic metals (Pt and Ag) with optical interference to optimize the visible light photo response of plasmonic metals deposited semiconductor (Pt—Ag/$Ag_3PO_4$—$WO_3$) for visible light assisted $H_2$ generation utilizing the aqueous bio-alcohols. Crystalline $Ag_3PO_4$ and $WO_3$ nanofibers were synthesized by microwave and electrospinning methods. Three different $WO_3$ nanofibers composition (5, 10 and 15 wt. %) were used to obtain $Ag_3PO_4/WO_3$ nanocomposite heterostructures, which are effective visible light active photo catalysts. Further, a simple, enviro-friendly, and cost-effective biogenic synthesis method have been achieved using *Salvia officinalis* extract to decorate Pt and Ag metal nanoparticles on the surface of $Ag_3PO_4$—$WO_3$ composites. Presence of bioactive agents in the extract are responsible for the Pt and $Ag_3PO_4$ reduction and for prevention of the Pt nanoparticles from aggregation in aqueous medium.

13 Claims, 11 Drawing Sheets

(56) References Cited

FOREIGN PATENT DOCUMENTS

| JP | 2014039919 | A  | * | 3/2014  | ............. | B01J 35/02 |
|----|------------|----|---|---------|---------------|------------|
| KR | 1284610    | B1 | * | 7/2013  | ............. | B82Y 40/00 |
| KR | 101792438  | B1 | * | 10/2017 | ............. | B82Y 40/00 |

OTHER PUBLICATIONS

Jianke Tang et al., "Fabrication of a novel Ag3PO4/WO3.H20 composite with enhanced visible light photocatalytic performance for the degradation of methylene blue and oxytetracycline." Inorganic Chemistry Communications 132, pp. 1-9. (Year: 2021).*

Hui Xu et al., "Three-dimensionally ordered microporous WO3 modified Ag3PO4 with enhanced visible light photocatalytic performance." Ceramics International 42, pp. 1392-1398. (Year: 2016).*

Hui Li et al., "Boosting visible-light photocatalytic degradation of indomethacin by an efficient and photostable Ag3PO4/NG/WO3 composites." Applied Surface Science 490, pp. 481-491. (Year: 2019).*

* cited by examiner

OPTIMIZATION OF PHOTOCATALYTIC HYDROGEN GENERATION USING AQUEOUS BIO-ALCOHOLS AND PLASMONIC METALS DEPOSITED ON SEMICONDUCTOR COMPOSITE NANOFIBERS

CROSS-REFERENCE TO RELATED APPLICATIONS

The present invention is a U.S. Continuation Patent Application that claims priority to U.S. Utility patent application Ser. No. 17/948,630, filed on Sep. 20, 2022, which claims priority to U.S. Provisional Patent Application No. 63/374,897, filed on Sep. 7, 2022, the entire disclosures of which are incorporated herein by reference.

FIELD OF THE INVENTION

The present invention relates to combines the advantages of fabrication of semiconductor heterostructure ($Ag_3PO_4$—$WO_3$) with plasmonic metals (Pt and Ag) with optical interference to optimize the visible light photo response of plasmonic metals deposited semiconductor (Pt—Ag/$Ag_3PO_4$—$WO_3$) for visible light assisted $H_2$ generation utilizing the aqueous bio-alcohols.

BACKGROUND OF THE INVENTION

Renewable hydrogen ($H_2$) and associated fuel cell technologies will play a major role in the development of clean energy and sustainable growth of the global economy [1]. Transitioning to a $H_2$ economy has the potential to decarbonize electricity and heat generation, and transportation, thereby reducing greenhouse gas emissions and anthropogenic climate change. There are several routes to renewable $H_2$ production, including the thermochemical reforming of fossil fuels or renewable organic feedstocks and electrochemical and/or photo(electro)chemical water splitting. The $H_2$ gas is commonly produced by steam reforming of naphtha or coal gasification [2], which both produce significant greenhouse gases [3]. The high cost of renewable $H_2$ represents a significant barrier to its adoption in the energy sector over conventional fossil fuel technologies, suggesting that the current industrial dependence on fossil fuels will persist for the foreseeable future [4]. This is because, the water splitting is limited by the current availability of renewable electricity and requirement for lower cost electrolyzers [5]. The $H_2$ production may use only renewable energy sources such as bio-alcohols, if obtained e.g. via photocatalysis or photoelectrochemical water splitting exploiting solar energy.

A common approach to activate a visible spectral response on semiconductor surfaces is to decorate them with metallic nanostructures that support localized surface plasmon resonance (LSPR) [6,7]. It is well known that the absorption of light by LSPR of metal nanostructures is tunable and depends strongly on the size, shape, aspect ratio of the nanostructures, the dielectric properties of both metal and the surrounding environment [8,9]. When deposited on semiconductor support, plasmonic nanostructures generate charge carriers so-called hot electrons, which can be injected into the semiconductor substrate. Upon visible light illumination, hot electrons are generated at metallic nanoparticles (Me-NPs) deposited on a semiconductor; therefore, they can be utilized in a photoelectrochemical configuration for water splitting. Several plasmon-induced Me-NPs/semiconductor photoelectrodes combinations have been proposed to enhance photoelectrochemical activity varying the semiconductor morphology and noble metals. In most cases, mono metallic species such as Au, Ag and Pt were utilized as plasmonic metals.

Furthermore, it was demonstrated that plasmonic effects in semiconductors are influenced substantially by the Fabry-Perot interference observed within metal oxides. By a control design of the semiconductor heterostructures, it is possible to fabricate the Fabry-Perot interference pattern to the plasmonic band(s) of metallic nanoparticles to efficiently utilize "hot" electron excitation/injection events. By proper adjustment of the Fabry-Perot interference pattern in the visible spectral range, the enhancement of both the intraband plasmonic excitation of s-band electrons and the interband transition of d-band electrons are expected [10].

Different nanosized semiconductors such as ZnO, $TiO_2$, $SnO_2$ and g-$C_3N_4$ etc. were used for $H_2$ production after applying various techniques to overcome the limitations of individual semiconductors [11]. Recently, silver orthophosphate ($Ag_3PO_4$) is extensively reported due to its high catalytic activities for photo-oxidation, photo degradation of organic pollutants and it also possessing antifouling properties [12]. Although, $Ag_3PO_4$ semiconductor has significant promising property to generate the oxygen, it has limited applications and directly not applied for hydrogen production from water due to its low conduction band potential and photo stability [13]. Number of $Ag_3PO_4$ based nanocomposites, such as Ag/$Ag_3PO_4$/$BiVO_4$ [14], g-$C_3N_4$/$MoS_2$/$Ag_3PO_4$ [15], g-$C_3N_4$/$Ag_3PO_4$ [16, 17] and Ag/$Ag_3PO_4$/$WO_3$ were prepared and applied for photo degradation of organic pollutants [18]. It was reported that $Ag_3PO_4$ effectively enhance the separation of electron-hole pair after application of light energy as development of strong electric field at the interface of $Ag_3PO_4$. Tungsten trioxide ($WO_3$) is a well-known n-type semiconductor with smaller band gap (2.4-2.8 eV). It has exhibited good photocatalytic activities with high photo corrosion resistant properties [19]. Due to its lower conduction band level, pure $WO_3$ exhibited fast recombination activities and cannot reach to sufficient potential to react with electron acceptors [20]. To overcome this limitation, some researchers utilized nanosized $WO_3$ for an effective charge separation [21]. Further, it is widely reported that presence of noble metal nanoparticles on the surface of semiconductor could induce LSPR, which enhance the visible-light absorption and drastically decrease the recombination of photo-generated electron-hole system. Different heterostructures based on $WO_3$ with noble metals such as $TiO_2$/Pt/$WO_3$ [22], $TiO_2$@$WO_3$/Au [23], $Ag_3PO_4$/Ag/$WO_3$-x [24], and Ag/$Ag_3PO_4$/$WO_3$ were reported for excellent photocatalytic activities for photodegradation of organic compounds. However, there is no specific research reported for synthesis of Pt and Ag metals decorated $Ag_3PO_4$—$WO_3$ heterostructure and its utilization of photo catalytic hydrogen production from bio-alcohols.

SUMMARY OF THE INVENTION

To address the foregoing problems, in whole or in part, and/or other problems that may have been observed by persons skilled in the art, the present disclosure provides compositions and methods as described by way of example as set forth below.

The present invention combines the advantages of fabrication of semiconductor heterostructure ($Ag_3PO_4$—$WO_3$) with plasmonic metals (Pt and Ag) with optical interference to optimize the visible light photo response of plasmonic metals deposited semiconductor (Pt—Ag/Ag$_3$PO$_4$—WO$_3$) for visible light assisted H$_2$ generation utilizing the aqueous bio-alcohols. A deep-rooted vision of this research is to provide new business opportunities in the future realizing the Kingdom of Saudi Arabia's Vision 2030 (a strategic framework to reduce Saudi Arabia's dependence on oil, diversify its economy, and develop public service sectors such as health, education, infrastructure, recreation, and tourism).

Crystalline Ag$_3$PO$_4$ and WO$_3$ nanofibers were synthesized by microwave and electrospinning methods. Three different WO$_3$ nanofibers composition (5, 10 and 15 wt. %) were used to obtain Ag$_3$PO$_4$/WO$_3$ nanocomposite heterostructures, which are effective visible light active photo catalysts. Further, a simple, enviro-friendly, and cost-effective biogenic synthesis method have been achieved using *Salvia officinalis* extract to decorate Pt and Ag metal nanoparticles on the surface of Ag$_3$PO$_4$—WO$_3$ composites. Presence of bioactive agents in the extract are responsible for the Pt and Ag$_3$PO$_4$ reduction and for prevention of the Pt nanoparticles from aggregation in aqueous medium. Various analytical techniques such as XRD, SEM, FT-IR, DR UV-vis, XPS and N$_2$-physisorption were utilized to characterize the synthesized photocatalysts. The band gap energy values were decreased after decoration of Pt and Ag metal nanoparticles over Ag$_3$PO$_4$—WO$_3$ nanocomposites. The Pt and Ag metal nanoparticles decorated Ag$_3$PO$_4$—WO$_3$ (10 wt %) nanocomposite exhibited highest photo catalytic activity for H$_2$ production from bioethanol due to possession of unique physico-chemical properties low band gap and surface area. In addition, presence of plasmonic nanoparticles assisted for the efficient electron trap to decrease the e$^-$-h+ recombination rate to enhance the hydrogen production.

Accordingly, in one embodiment, the invention relates to crystalline Ag$_3$PO$_4$—WO$_3$ composite nanofibers comprising 5 to 15 wt. % WO$_3$, wherein the composite nanofibers are visible light active photo catalysts. In some embodiments, the composite nanofibers are produced by a process comprising the steps of:
 a) synthesizing crystalline Ag$_3$PO$_4$ powder via microwave synthesis method;
 b) synthesizing crystalline WO$_3$ nanofibers via electrospinning method; and
 c) dispersing the crystalline Ag$_3$PO$_4$ and the crystalline WO$_3$ in a solution of alcohol and water and synthesizing Ag$_3$PO$_4$/WO$_3$ composite nanofibers via ultrasonication homogenization.

In some embodiments, the composite nanofibers further comprise metal nanoparticles on a surface of the composite nanofibers. In other embodiments, the metal nanoparticles are decorated with a plant extract comprising bioactive agents capable of preventing the metal nanoparticles from aggregating in an aqueous medium and/or capable of reducing the metal nanoparticles, particularly wherein the plant extract is derived from *Salvia officinalis*. In other embodiments, the metal nanoparticles comprise Pt and/or Ag metals. In further embodiments, the composite nanofibers have:
 i) a lower band gap relative to WO$_3$ and/or AgP;
 ii) a higher surface area relative to WO$_3$ and/or AgP; and/or
 iii) improved photocatalytic activity for H$_2$ production from bioethanol relative to WO$_3$ and/or AgP.

In still further embodiments, a process is provided for making crystalline Ag$_3$PO$_4$—WO$_3$ composite nanofibers, the process comprising the steps of:
 a) synthesizing crystalline Ag$_3$PO$_4$ powder via microwave synthesis;
 b) synthesizing crystalline WO$_3$ nanofibers via electrospinning; and
 c) dispersing the crystalline Ag$_3$PO$_4$ and the crystalline WO$_3$ in a solution of alcohol and water and synthesizing Ag$_3$PO$_4$/WO$_3$ composite nanofibers via ultrasonication homogenization;
wherein the composite nanofibers comprise 5 to 15 wt. % WO$_3$ and are visible light active photo catalysts. In some embodiments, the composite nanofibers further comprise metal nanoparticles on a surface of the composite nanofibers. In other embodiments, the metal nanoparticles are decorated with a plant extract comprising bioactive agents capable of preventing the metal nanoparticles from aggregating in an aqueous medium and/or capable of reducing the metal nanoparticles, particularly wherein the plant extract is derived from *Salvia officinalis*. In other embodiments, the metal nanoparticles comprise Pt and/or Ag metals. In further embodiments, the composite nanofibers have:
 i) a lower band gap relative to WO$_3$ and/or AgP;
 ii) a higher surface area relative to WO$_3$ and/or AgP; and/or
 iii) improved photocatalytic activity for H$_2$ production from bioethanol relative to WO$_3$ and/or AgP.

Additional features of the invention will be or will become apparent to one with skill in the art upon examination of the following figures and detailed description. It is intended that all such additional features and advantages be included within this description, be within the scope of the invention, and be protected by the accompanying claims.

BRIEF DESCRIPTION OF THE DRAWINGS

Having thus described the subject matter of the present invention in general terms, reference will now be made to the accompanying drawings, which are not necessarily drawn to scale, and wherein:

FIGS. 1A-1F show photocatalytic reforming functionality data for synthesized catalysts: A) Influence of reaction time; B) Influence of bioethanol concentration; C) Influence of pH; D) Influence of mass of catalyst; E) Influence of reaction temperature; and F) Recyclability of Pt—Ag/AgP—WO$_3$ (2) catalyst.

Figure 2A:
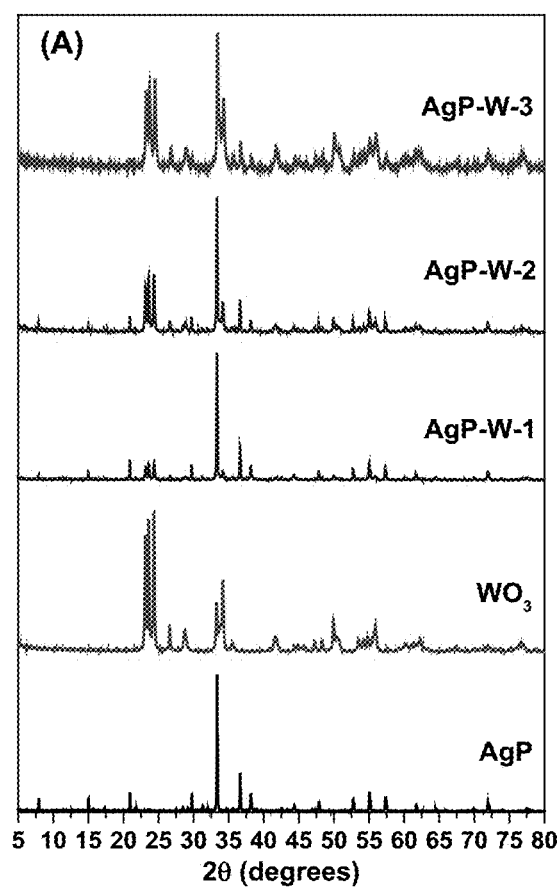
Figure 2B:
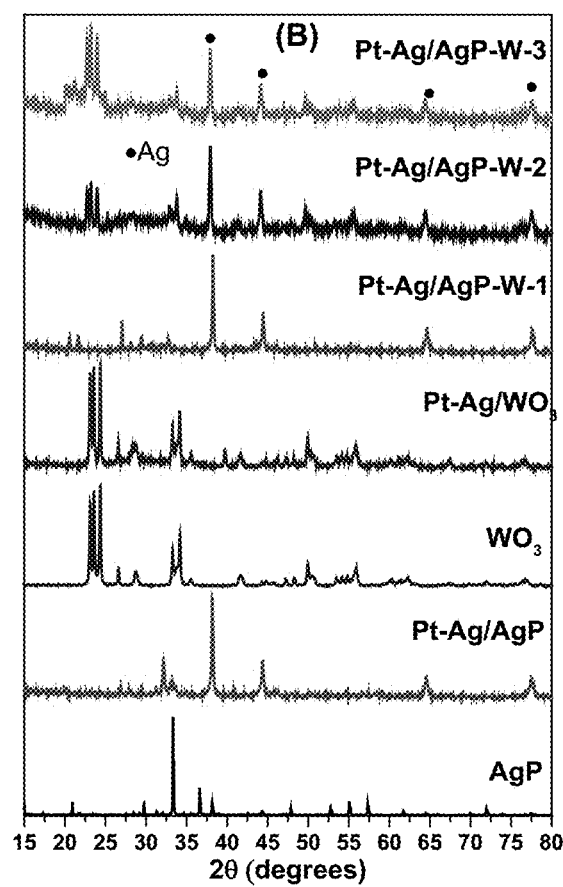
Figure 3A:
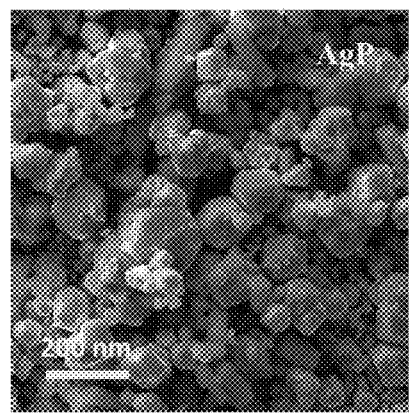
Figure 3B:
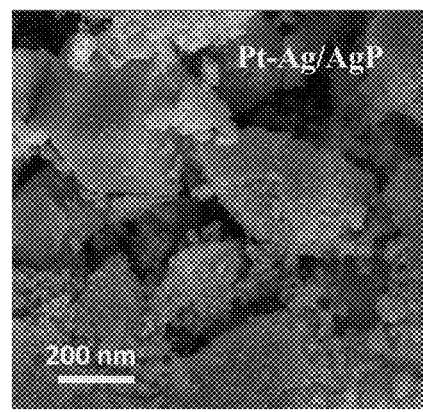
Figure 3C:
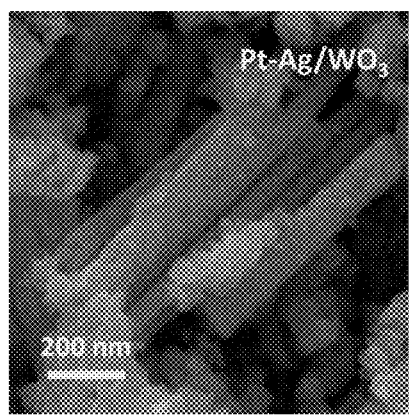
Figure 3D:
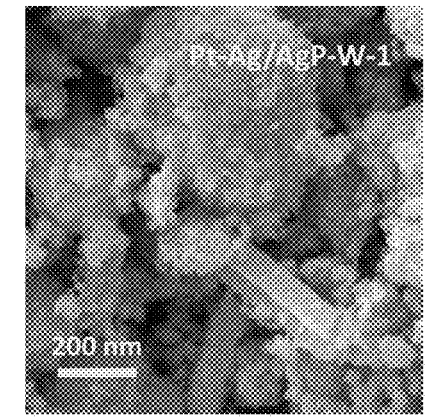
Figure 3E:
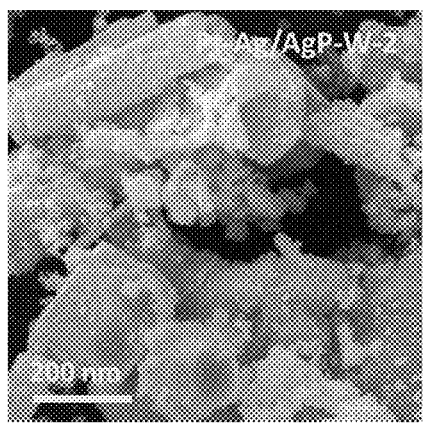
Figure 3F:
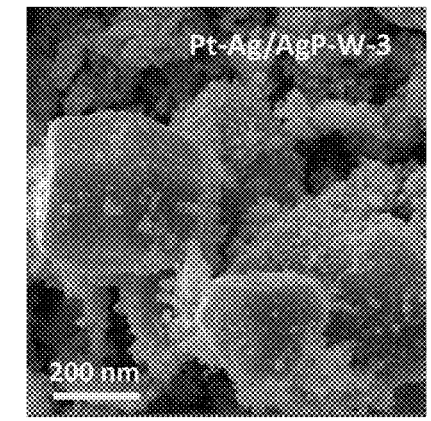

FIGS. 2A-2B show XRD patterns of: A) bare Ag$_3$PO$_4$—WO$_3$; and B) Pt decorated Ag$_3$PO$_4$—WO$_3$ nanocomposites.

FIGS. 3A-3F show SEM images of the synthesized samples: A) AgP; B) Pt—Ag/AgP; C) Pt—Ag/WO$_3$; D) Pt—Ag/AgP—W-1; E) Pt—Ag/AgP—W-2; and F) Pt—Ag/AgP—W-3.

Figure 4:
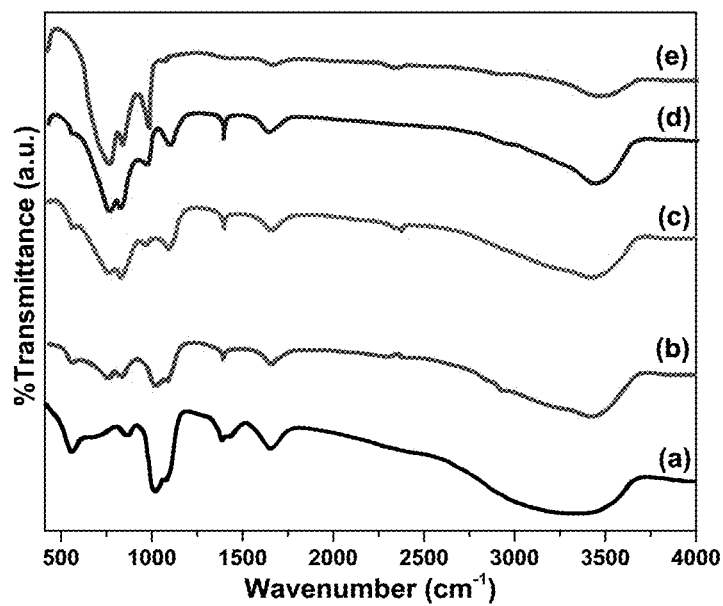

FIG. 4 shows FT-IR spectra of Pt deposited: a) AgP; b) AgP—W-1; c) AgP—W-2; d) AgP—W-3; and e) WO$_3$.

Figure 5A:
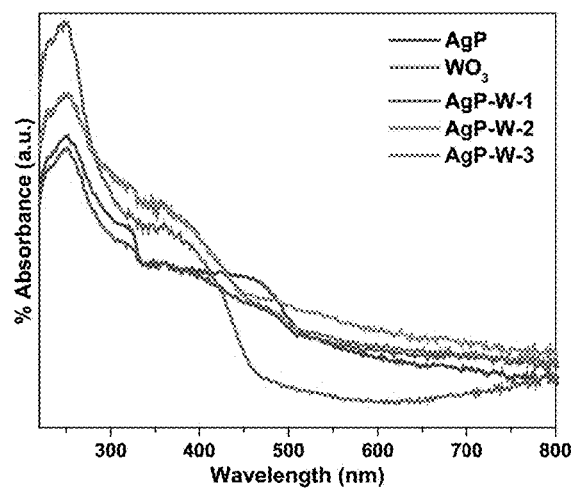
Figure 5B:
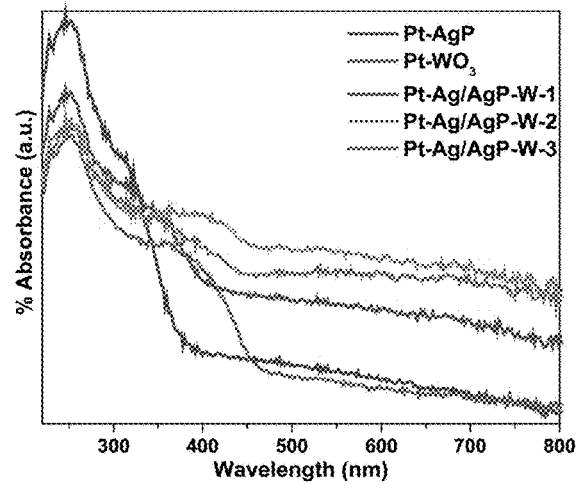
Figure 6A:
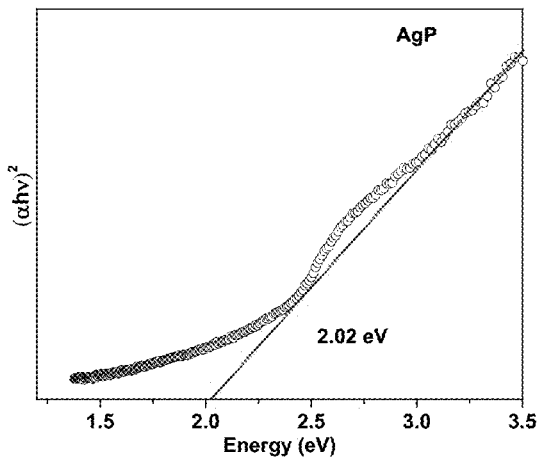
Figure 6B:
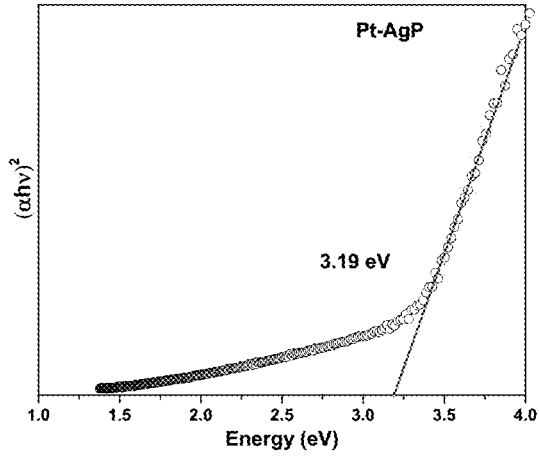
Figure 6C:
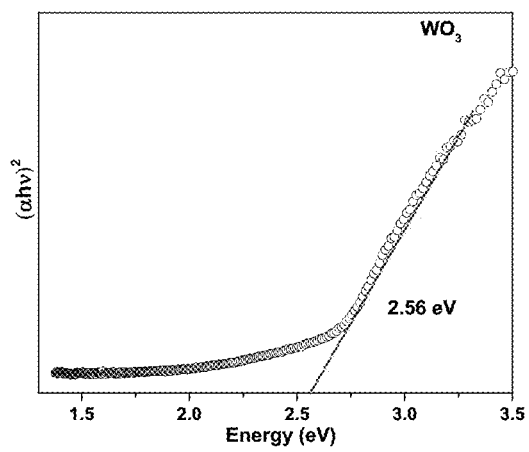
Figure 6D:
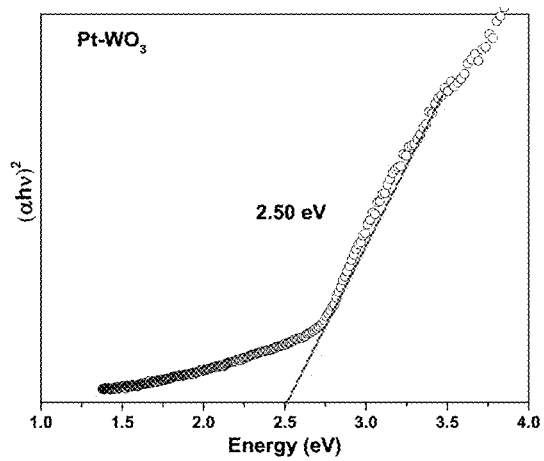
Figure 6E:
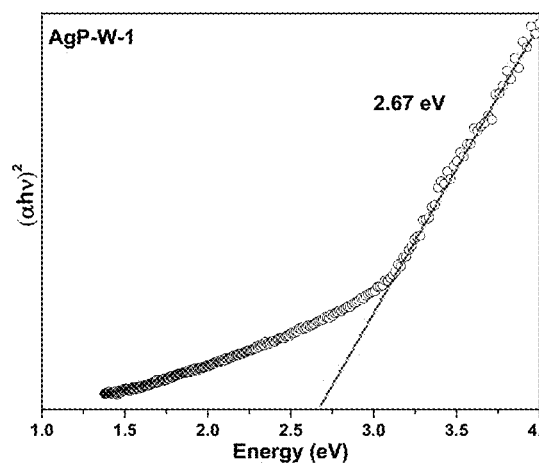
Figure 6F:
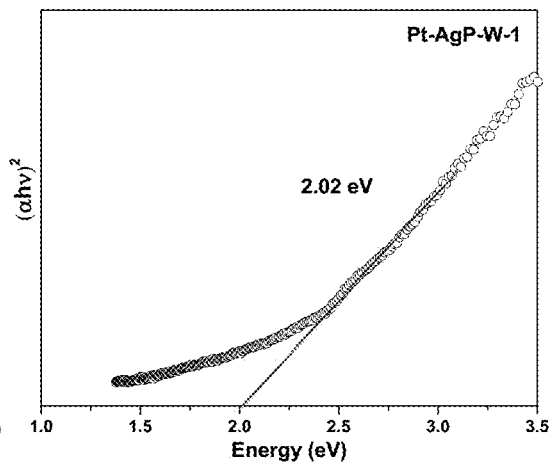
Figure 6G:
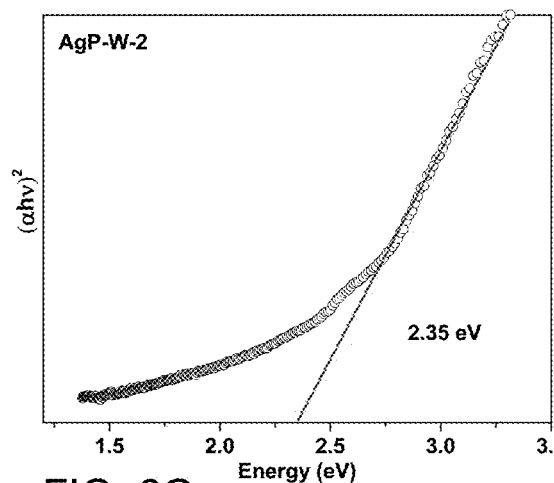
Figure 6H:
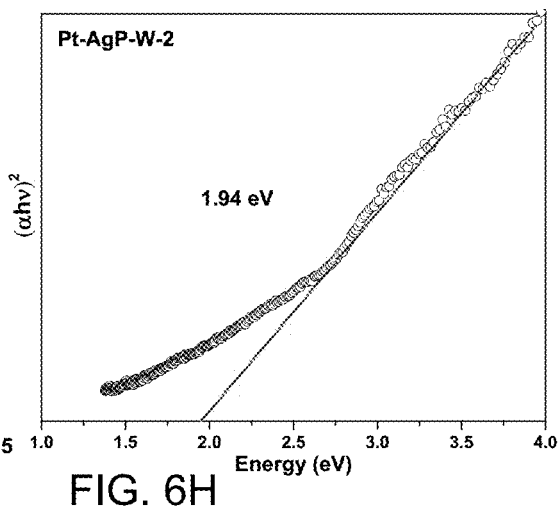
Figure 6I:
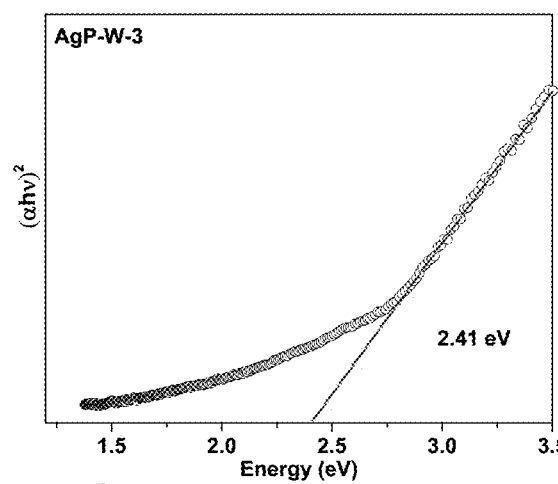
Figure 6J:
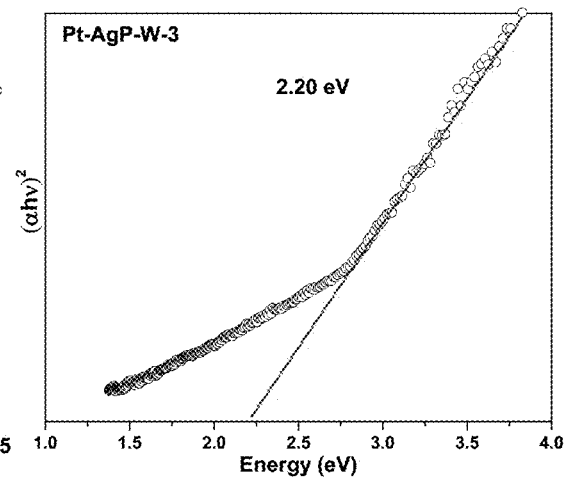

FIGS. 5A and 5B show DR UV-vis spectra of the samples: A) AgP, WO$_3$, AgP—W-1, AgP—W-2, AgP—W-3; and B) Pt—AgP, Pt—WO$_3$, Pt—Ag/AgP—W-1, Pt—Ag/AgP—W-2, Pt—Ag/AgP—W-3

FIGS. 6A-6J show Tauc plots to determine the band gap energy of photocatalysts: A) AgP; B) Pt—AgP; C) WO$_3$; D) Pt—WO$_3$; E) AgP—W-1; F) Pt—AgP—W-1; G) AgP—W-2; H) Pt—AgP—W2; I) AgP—W-3; and J) Pt—AgP—W-3.

Figure 7:
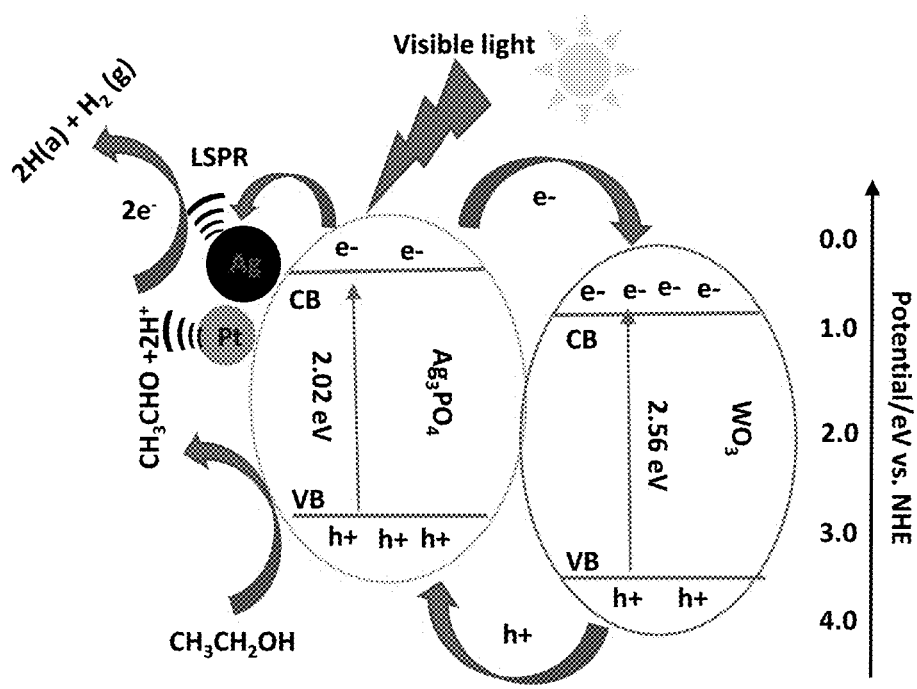
Figure 8A:
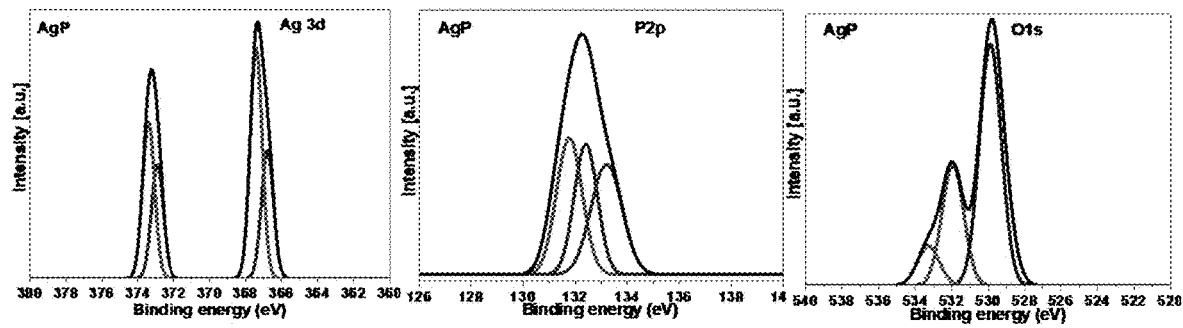
Figure 8B:
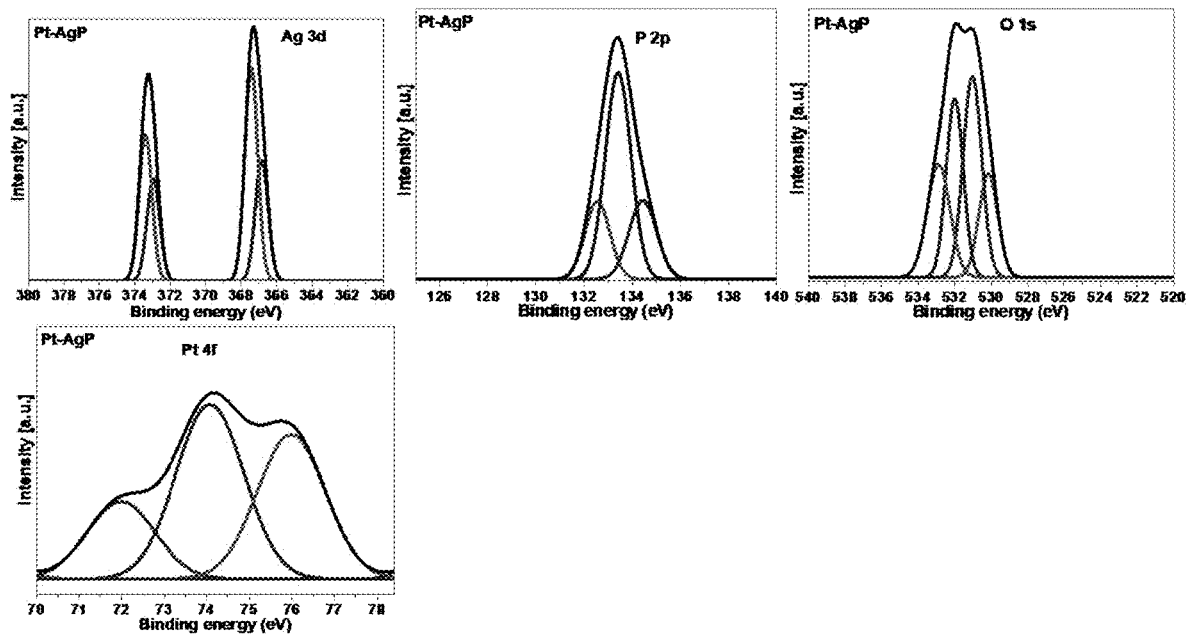
Figure 8C:
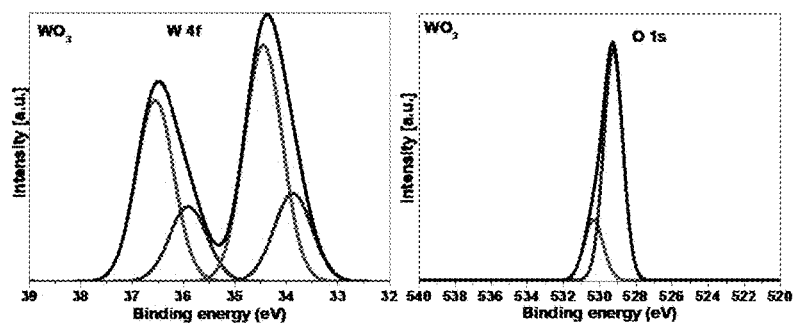
Figure 8D:
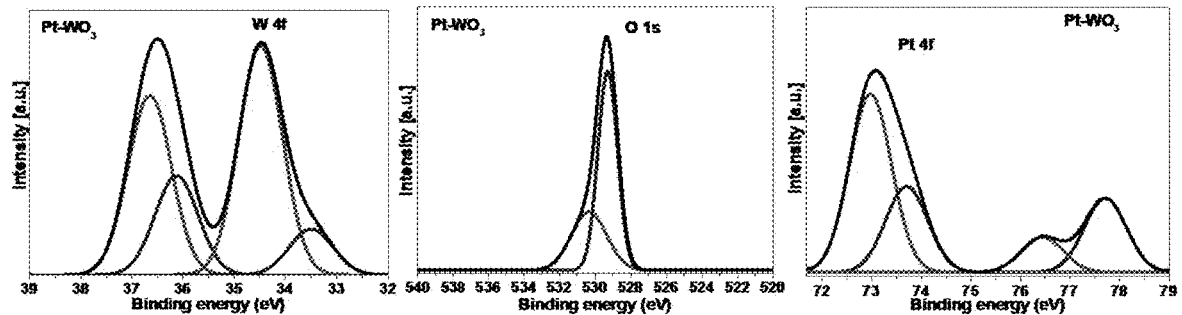
Figure 8E:
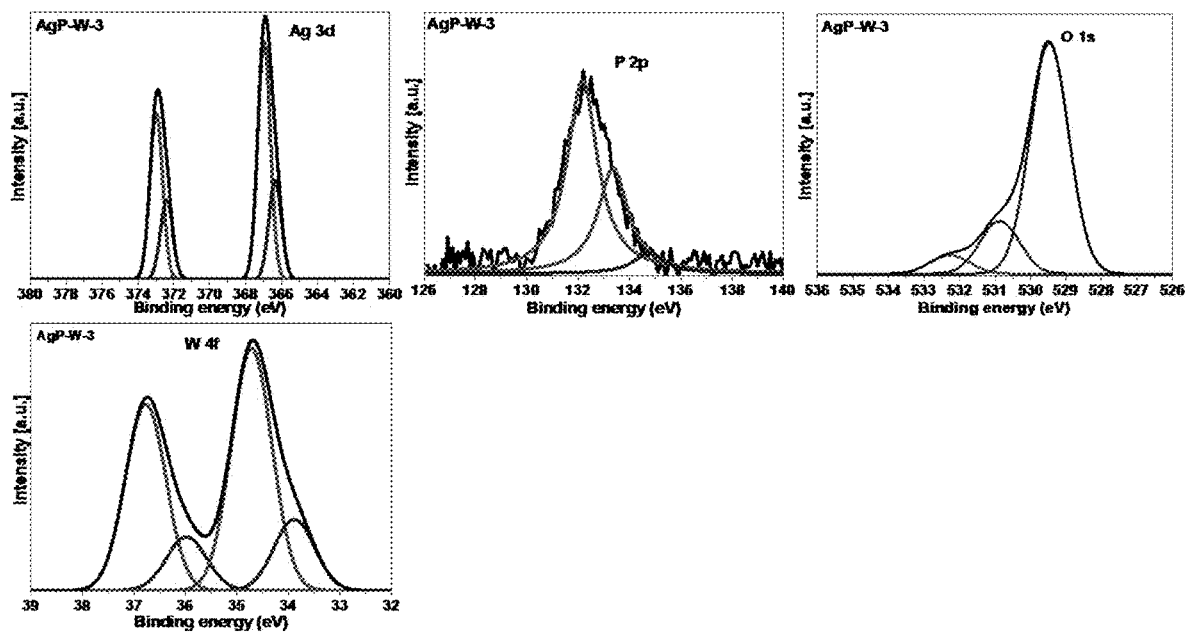
Figure 8F:
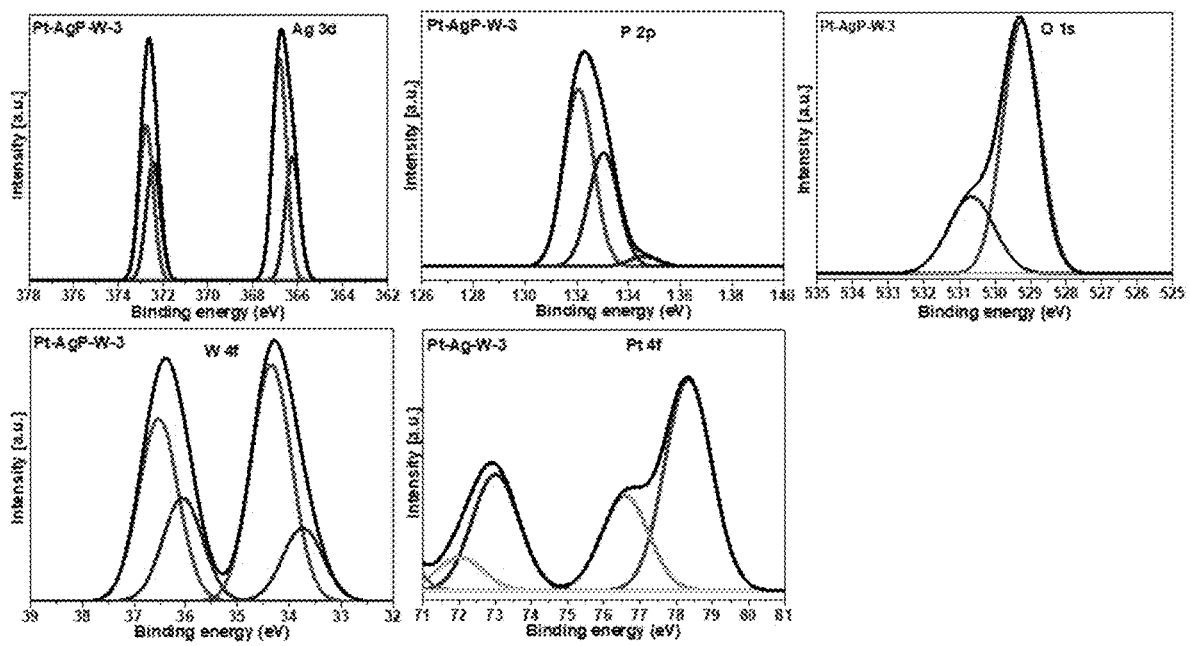

FIG. 7 shows a schematic representation of photo reforming of ethanol over synthesized Pt—Ag/AgP—WO$_3$ catalyst.

FIGS. 8A-8F show deconvoluted XPS spectra of the representative bulk and Pt deposited: A) AgP; B) Pt—AgP; C) WO$_3$; D) Pt—WO$_3$; E) AgP—W-3; and F) Pt—AgP—W-3.

DETAILED DESCRIPTION

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated drawings. All illustrations of the drawings are for the purpose of describing selected versions of the present invention and are not intended to limit the scope of the present invention. Therefore, it is to be understood that the subject matter of the present invention is not to be limited to the specific embodiments disclosed and that modifications and other embodiments are intended to be included within the scope of the appended claims.

Optimization of Photocatalytic Hydrogen Generation Using Aqueous Bio-Alcohols and Plasmonic Metals Deposited on Semiconductor Composite Nanofibers The present invention combines the advantages of fabrication of semiconductor heterostructure ($Ag_3PO_4$—$WO_3$) with plasmonic metals (Pt and Ag) with optical interference to optimize the visible light photo response of plasmonic metals deposited semiconductor (Pt—Ag/$Ag_3PO_4$—$WO_3$) for visible light assisted $H_2$ generation utilizing the aqueous bio-alcohols.

Crystalline $Ag_3PO_4$ and $WO_3$ nanofibers were synthesized by microwave and electrospinning methods. Three different $WO_3$ nanofibers composition (5, 10 and 15 wt. %) were used to obtain $Ag_3PO_4$/$WO_3$ nanocomposite heterostructures, which are effective visible light active photo catalysts. Further, a simple, enviro-friendly, and cost-effective biogenic synthesis method have been achieved using *Salvia officinalis* extract to decorate Pt and Ag metal nanoparticles on the surface of $Ag_3PO_4$—$WO_3$ composites. Presence of bioactive agents in the extract are responsible for the Pt and $Ag_3PO_4$ reduction and for prevention of the Pt nanoparticles from aggregation in aqueous medium. Various analytical techniques such as XRD, SEM, FT-IR, DR UV-vis, XPS and $N_2$-physisorption were utilized to characterize the synthesized photocatalysts. The band gap energy values were decreased after decoration of Pt and Ag metal nanoparticles over $Ag_3PO_4$—$WO_3$ nanocomposites. The Pt and Ag metal nanoparticles decorated $Ag_3PO_4$—$WO_3$ (10 wt %) nanocomposite exhibited highest photo catalytic activity for $H_2$ production from bioethanol due to possession of unique physico-chemical properties low band gap and surface area. In addition, presence of plasmonic nanoparticles assisted for the efficient electron trap to decrease the $e^-$-h-F recombination rate to enhance the hydrogen production.

Accordingly, in one embodiment, the invention relates to crystalline $Ag_3PO_4$—$WO_3$ composite nanofibers comprising 5 to 15 wt. % $WO_3$, wherein the composite nanofibers are visible light active photo catalysts. In some embodiments, the composite nanofibers are produced by a process comprising the steps of:
a) synthesizing crystalline $Ag_3PO_4$ powder via microwave synthesis method;
b) synthesizing crystalline $WO_3$ nanofibers via electrospinning method; and
c) dispersing the crystalline $Ag_3PO_4$ and the crystalline $WO_3$ in a solution of alcohol and water and synthesizing $Ag_3PO_4$/$WO_3$ composite nanofibers via ultrasonication homogenization.

In some embodiments, the composite nanofibers further comprise metal nanoparticles on a surface of the composite nanofibers. In other embodiments, the metal nanoparticles are decorated with a plant extract comprising bioactive agents capable of preventing the metal nanoparticles from aggregating in an aqueous medium and/or capable of reducing the metal nanoparticles, particularly wherein the plant extract is derived from *Salvia officinalis*. In other embodiments, the metal nanoparticles comprise Pt and/or Ag metals. In further embodiments, the composite nanofibers have:
i) a lower band gap relative to $WO_3$ and/or AgP;
ii) a higher surface area relative to $WO_3$ and/or AgP; and/or
iii) improved photocatalytic activity for $H_2$ production from bioethanol relative to $WO_3$ and/or AgP.

In still further embodiments, a process is provided for making crystalline $Ag_3PO_4$—$WO_3$ composite nanofibers, the process comprising the steps of:
a) synthesizing crystalline $Ag_3PO_4$ powder via microwave synthesis method;
b) synthesizing crystalline $WO_3$ nanofibers via electrospinning method; and
c) dispersing the crystalline $Ag_3PO_4$ and the crystalline $WO_3$ in a solution of alcohol and water and synthesizing $Ag_3PO_4$/$WO_3$ composite nanofibers via ultrasonication homogenization;

wherein the composite nanofibers comprise 5 to 15 wt. % $WO_3$ and are visible light active photo catalysts. In some embodiments, the composite nanofibers further comprise metal nanoparticles on a surface of the composite nanofibers. In other embodiments, the metal nanoparticles are decorated with a plant extract comprising bioactive agents capable of preventing the metal nanoparticles from aggregating in an aqueous medium and/or capable of reducing the metal nanoparticles, particularly wherein the plant extract is derived from *Salvia officinalis*. In other embodiments, the metal nanoparticles comprise Pt and/or Ag metals. In further embodiments, the composite nanofibers have:
i) a lower band gap relative to $WO_3$ and/or AgP;
ii) a higher surface area relative to $WO_3$ and/or AgP; and/or
iii) improved photocatalytic activity for $H_2$ production from bioethanol relative to $WO_3$ and/or AgP.

EXAMPLES

Materials and Methods

Preparation of Nanocomposite Samples

Synthesis of crystalline $Ag_3PO_4$ by microwave synthesis method: To synthesize crystalline $Ag_3PO_4$ powder, 0.1 M aqueous solution of $(NH_4)_2HPO_4$ was slowly added to aqueous $AgNO_3$ solution (0.15 M), then the pH of the contents was adjusted to 10 by adding the $NH_4OH$ solution to obtain a precipitate. Then, the formed precipitate was transferred into a specially designed polymer vessel with temperature and pressure-controlled sensors. The vessel was then subjected to microwave irradiation (power between 150 and 300 W) to maintain 140° C. for 30 min by using Microwave lab station (Ethos, Milestone). After the microwave treatment, the obtained material was washed with water and ethanol and dried at 80° C. for 3 h.

Synthesis of $WO_3$ nanofibers by electrospinning method: To synthesize the $WO_3$ nanofibers, polymethylmethacrylate (PMMA, MW=120,000) and tungsten hexachloride solutions were used as precursors. First, the PMMA was dissolved in chloroform and tungsten hexachloride was dissolved in 2-methoxyethanol and then the two solutions were mixed at 50° C. under stirring for 20 minutes under ultrasonication. The $WO_3$ nanofibers were grown onto a silicon substrate using electrospinning device at room temperature. The solution was taken in a syringe that is positioned in the Plexiglas box and raised from a metallic support. The needle of syringe is connected to the positive electrode of the high voltage power supply. The substrate is placed on a metallic support and is grounded. The applied voltage was varied from 17 kV to 20 kV and a 15 cm distance was maintained from needle to substrate. After deposition, the sample was calcined at 500° C. to remove the PMMA and to crystallize the $WO_3$ nanofibers.

Preparation of $Ag_3PO_4/WO_3$ nanocomposites: The $Ag_3PO_4/WO_3$ nanocomposites were synthesized by following a simple ultrasonication homogenization method. For the synthesis, 100 mg of $WO_3$ was dispersed in 25 mL of ethyl alcohol and water (75:25 vol %) by sonication for 30 min. Then calculated amount of $Ag_3PO_4$ powder was added next to the dispersion and again subjected to sonication for 30 min. The resulting dispersion was heated in an electric oven at 100° C. until the complete evaporation of solvent. During the preparation, 'x' weight percentage of $WO_3$ (x=5, 10 and 15 wt. %) was added to the $Ag_3PO_4$ dispersion and the obtained composites were named accordingly as AgP—W-1, AgP—W-2, and AgP—W-3 respectively.

Pt and Ag-decorated $Ag_3PO_4$—$WO_3$ nanomaterials by green extract method: In the beginning, 20 g of clean leaves of *Salvia officinalis* (commonly known as 'Sage') were washed, dried and grinded well. Then, the grounded leaves were boiled in 100 mL of double distilled water for 30 minutes and the aqueous extract was obtained by vacuum filtration. The obtained extract was used to decorate the Pt nanoparticles over $Ag_3PO_4$—$WO_3$ nanocomposites. Calculated amount of $H_2PtCl_6·6H_2O$ corresponding to 1.0 wt. % of Pt was dissolved in 90 mL of double distilled water and then 10 mL of plant extract solution was added for the reduction of Pt nanoparticles under constant stirring. Finally, calculated amount of $Ag_3PO_4$—$WO_3$ nanocomposite powder was added and stirred for 1 h, then the excess water was removed by centrifugation. The obtained Pt and Ag metals decorated $Ag_3PO_4$—$WO_3$ nanocomposites were dried at 100° C. and calcined at 300° C.

Characterization of Synthesized Nanomaterials

The elemental composition of the synthesized materials was determined by using ICP-AES, Optima 7300DV (PerkinElmer) instrument. The XRD patterns of the powders were collected by using PANalytical XpertPro diffractometer. The crystallite size of obtained materials was determined by applying the Debye-Scherer equation. The TEM analysis of the samples was carried out using JEOL 2100HT microscope operated at 200 kV, with images collected on a Gatan digital camera. The laser Raman spectral analysis of the samples was carried out using Bruker Equinox 55 FT-IR spectrometer equipped with an FRA106/S FT-Raman module and a liquid nitrogen cooled Ge detector using the 1064-nm line of a Nd:YAG laser with an output laser power of 200 mW. The X-ray photoelectron spectra of the samples were collected using Thermo-Scientific Escalab 250 Xi XPS instrument with Al Kα X-rays having a spot size of 650 mm. The peak shift due to charge compensation was corrected using the binding energy of C1s peak. The data was acquired using pass energy of 100 eV, dwell time 200 ms with a step size of 0.1 eV and 10-30 scans. The quantitative determination of the Pt active sites over the catalysts using CO pulse chemisorption measurements using laboratory made equipment. Prior to analysis, known amount of the sample (100 mg) was reduced at 250° C. under $H_2$ flow (40 mL min$^{-1}$) for 60 min and then cooled to 25° C. under the flow of helium gas. Then, the CO pulse injection was conducted in a flow of helium gas stream. The metal dispersion was evaluated from the amount of CO consumption (assuming CO/Pt=1). The textural properties of the samples were obtained from the $N_2$-physisorption experiments, which were conducted using Quantachrome ASiQ adsorption system. Optical properties were measured by Thermo-Scientific evolution UV-vis spectrophotometer equipped with an integrating sphere in the wavelength range of 200-800 nm to measure the reflectance spectra of samples. Band gap energy values of all the samples were calculated using Kubelka-Munk method. The Kubelka-Munk factor (K) was determined by following equation; $K=(1-R)^2/2R$, where R is the % reflectance. The wavelengths (nm) were translated into energies (E) and a plot was drawn between $(K*E)^{0.5}$ and E to obtain a curve. The bandgap energy (eV) was obtained as the intersection point of the two slopes in the curve Photocatalytic Reforming of Bioethanol to Hydrogen Photocatalytic reactions were conducted in the liquid phase in a Pyrex flask under an argon atmosphere. The catalyst (150 mg) was dispersed by stirring at 500 rpm in 120 mL of a 20 vol % ethanolic aqueous solution at 25° C. for 30 min in the dark to equilibrate any adsorption processes and ensure a uniform catalyst suspension. The reactor was then evacuated and irradiated by a 300 W Xe lamp providing a flux of approximately 125 mW·cm$^{-2}$ in the reaction zone for 1 h. Evolved gases flowing into the gas chromatograph sample loop through a closed gas circulation and the product analysis for $H_2$ was carried out by using a Varian 3300 gas chromatograph with a thermal conductivity detector and a 2 m MS 13× column.

Results and Discussion

Photocatalytic Reforming Activity

The photocatalytic reforming functionality of as prepared $Ag_3PO_4$, $WO_3$, AgP—$WO_3$ composites and Pt—Ag decorated $Ag_3PO_4$, $WO_3$ nanofibers, AgP—$WO_3$ composite catalysts was tested by determining the hydrogen production from the aqueous ethanol solution. Different reaction parameters such as reaction time, methanol concentration, weight of the catalyst, pH of reactants mixture and reaction temperature were studied to optimize the reaction conditions. The obtained photocatalytic activity results are depicted in FIG. 1. The photocatalytic activity results are clearly demonstrating that Pt and Ag decorated AgP—$WO_3$ composites are superior catalysts compared to AgP—$WO_3$ composites. In case of Pt—Ag/AgP—$WO_3$ samples, the Pt and Ag nanoparticles accepts the photogenerated electrons from CB of AgP to extend the lifetime of the charge carrier. The time on stream analysis was performed for all the synthesized catalysts, and the results are shown in FIG. 1 (A). The figure shows the amount of hydrogen produced under optimized reaction conditions over all the samples. The highest amount of hydrogen was produced after 12 hours of reaction in the samples and Pt—Ag/AgP—$WO_3$ (2) catalyst sample exhibited the highest activity among the synthesized samples. After 12 hours of reaction, the activity of catalysts has not decreased considerably.

Figure 1A:
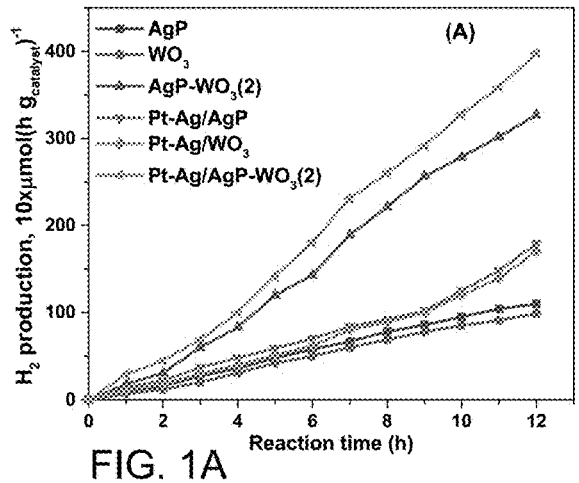
Figure 1B:
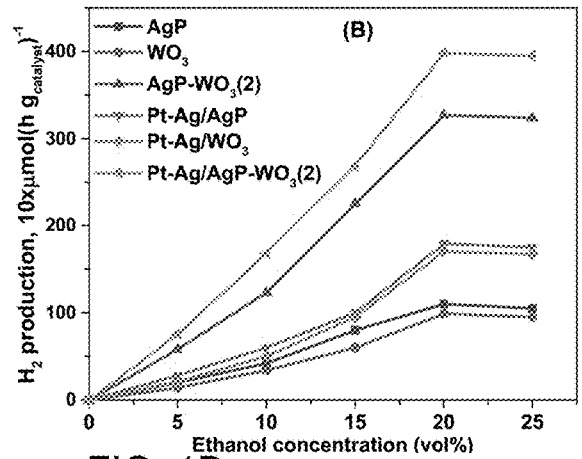
Figure 1C:
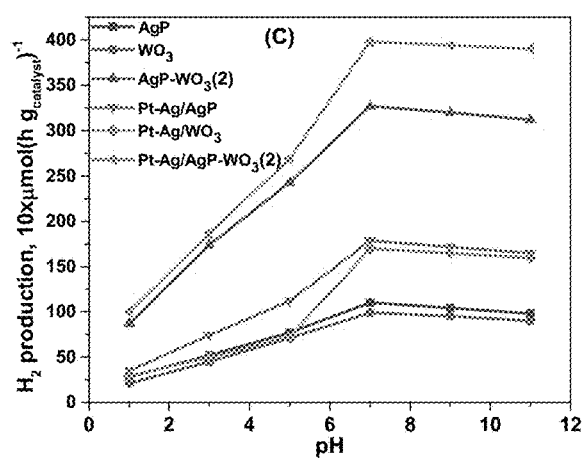
Figure 1D:
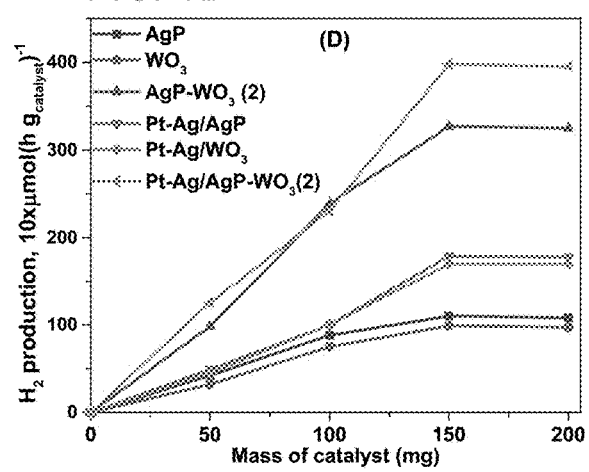

When the reactant feed contained only water without ethanol, the $H_2$ evolution is negligible, however $H_2$ production increased with increase of vol % of ethanol and reached to the maximum at 20 vol. % in case of all the synthesized AgP—$WO_3$ composites samples [FIG. 1(B)]. However, further increase of vol % of ethanol above 20 vol. % did not showed any significant change in $H_2$ production. It is observed that both Pt—Ag decorated and pure AgP—$WO_3$ composites samples showed similar behavior although the $WO_3$ content is different. Decoration of Pt and Ag nanoparticles resulted considerable improvement in the $H_2$ production in the samples with different $WO_3$ composition. The previous studies indicated that with increase of vol % of ethanol increases, a greater number of ethanol molecules adsorbs on the semiconductor surface blocking the visible light to reach to ethanol molecules, resulting decrease in the photocatalytic reformation of ethanol to $H_2$. Thus, an optimum ethanol concentration is existed for the AgP—$WO_3$ composites. The obtained data indicating that bulk AgP—$WO_3$-2 and Pt—Ag decorated AgP—$WO_3$-2 composite samples showed highest activity, 3250 $\mu mol\ g^{-1}$ and 4010 $\mu mol\ g^{-1}$ respectively.

It was reported that electrostatic interactions between the photocatalyst surface and the reactants play an important role in photocatalytic activity. To study the influence of pH of the ethanol and water solution on the catalyst performance, different aqueous ethanol solutions with pH between 1 and 11 were prepared and used to photocatalytic experiments. The obtained results are plotted in FIG. 1. (C). The results indicating that tested catalysts exhibited better performance when the solutions pH is around 7.0 as the pH at the point of zero charge (pHpzc) of $Ag_3PO_4$ is 6.65. It is interesting to note that pzc for $WO_3$ is around pH 2.5, however the major constituent of the synthesized photocatalysts is $Ag_3PO_4$ and therefore it is not expected any deviation from the suitable pH of solution to obtained highest photocatalytic activity. It was previously observed that the catalysts produced high amount of hydrogen production at neutral pH. It was also observed that change of pH of the solution (acidic or basic) altered the hydrogen production rates significantly. Similar results were observed in case of bulk AgP—$WO_3$ and Pt—Ag decorated AgP—$WO_3$ composite samples. The —OH groups on the surface of AgP—$WO_3$ composite enables the adsorption of ethanol molecules via hydrogen bonding [26]. The synthesized Pt—Ag decorated AgP—$WO_3$ composites consists of particles with specific polyhedral and nanofiber morphology exhibited superior photo reforming activity due to presence of more surface —OH species and relatively high surface area (characterization results). Previously, it was reported that reformation of alcohols progress stepwise, involving formation of intermediate compounds [27]. In acidic solution, the rate of conversion of $CH_3CH_2OH$ to $CH_3CHO$ (FIG. 7) is low, which could hinder the formation of hydrogen production as $CH_3CHO$ could easily convert into another carbonyl compounds. On other hand, in basic solution, $CH_3COOH$ could be oxidized to form CO 2 due to deprotonation. In addition, the pH could affect the surface functional groups [28]. It is known that $Ag_3PO_4$ is normally amphoteric and $WO_3$ is acidic in nature. The change in pH of the aqueous ethanol solution results change in the surface acidity-basicity characteristics of AgP—$WO_3$ composite, which influence the ethanol adsorption. In basic solution, the negatively charged semiconductor surface resulted lower the rate of $H_2$ production due to interaction between ethanol and AgP—$WO_3$ is lower [29].

FIG. 1 (D) shows influence of catalyst amount on the photocatalytic reformation of ethanol to hydrogen over synthesized AgP—$WO_3$ catalysts using 20 vol. % ethanol solution at pH=7.0. The hydrogen production enhanced gradually with increase of catalyst weight from 50 to 150 mg, however, increase of catalyst weight to 200 mg have not resulted further increase in hydrogen production; a stabilized activity was observed. The observed results indicated that 150 mg is the optimum catalyst weight to obtain the best photocatalytic reforming performance; this is probably because of number of catalytically active sites exposed to reacting ethanol molecules have not changed, when the catalyst amount is beyond 150 mg. It is also possible that the light energy may not be able to reach to the active sites as increase in light scattering could occur because of catalyst weight increase. Slight decrease of surface area was also observed due to accumulation of catalyst particles when the catalyst amount is more than optimum [30].

Figure 1E:
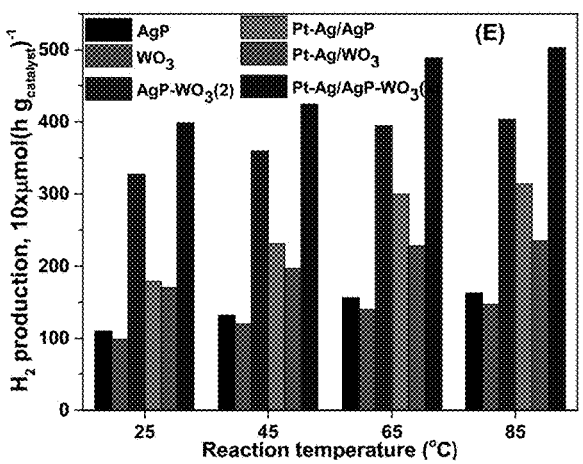

Further, we also studied the role of reaction temperature on the photocatalytic ethanol reforming activity of the catalysts between 25° C. and 85° C. [FIG. 1(E)]. As shown in the figure, increase in hydrogen production was observed with increase of reaction temperature from 25° C. to 85° C. in case of all the tested catalysts. We previously investigated Pt—$TiO_2$ anatase nanocomposite catalysts for photocatalytic hydrogen production using aqueous methanol solution and we noticed that the quantum yield is proportional to the reaction temperature [31]; as it has a great influence over the quantum yield, most probably because of the thermal activation of products desorption. The observed results for synthesized Pt—Ag/AgP—$WO_3$ catalysts are similar to our previous studies. We have not tested the photo reforming of bioethanol beyond 85° C., since there is possibility for the decrease of ethanol adsorption on surface of the catalyst above 85° C.

Figure 1F:
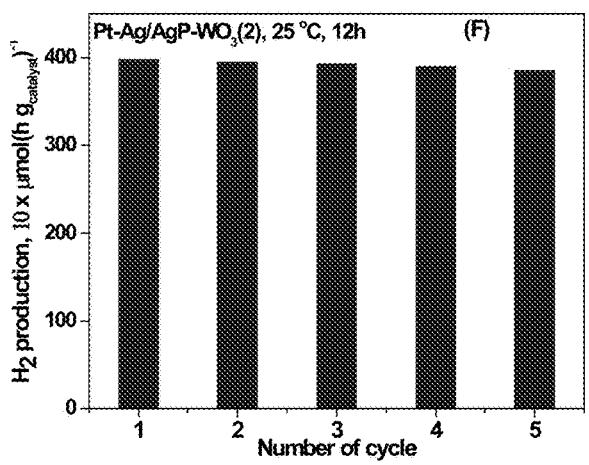

The stability of photocatalyst under actual reaction conditions is a crucial factor in development of catalyst for any photocatalytic process because the catalysts generally undergo photo-corrosion during to catalytic tests. The stability of the Pt—Ag decorated AgP—$WO_3$ composite catalysts was also studied. To study the reusability of the synthesized Pt—Ag/AgP—$WO_3$ catalysts, we filtered the catalyst after the first cycle of the reaction, washed, dried, and thermally treated at 90° C. for 1 h and used the catalyst for next cycle of the reaction. The recycled catalyst was reused for five cycles The FIG. 1(F) shows the photocatalytic reforming activity of most active catalyst [Pt—Ag/AgP—$WO_3$ (2)]. The Pt—Ag/AgP—$WO_3$ (2) catalyst showed photocatalytic performance for hydrogen production without significant decline in photo reformation activity. The photostability of Pt—Ag/AgP—$WO_3$ (2) catalyst is probably due to the structural stability and high resistance to photo-corrosion under studied reaction conditions.

Characterization

The phase purity and crystal structure of synthesized bare and Pt deposited $WO_3$, $Ag_3PO_4$ and AgP—$WO_3$ nanocomposites were determined using powder XRD analysis. As shown in the FIG. 2, the characteristic XRD reflections for the body-centered cubic structure of $Ag_3PO_4$ [JCPDS No. 06-0505], while the reflections observed for $WO_3$ sample could be assigned to the orthorhombic $WO_3$ crystalline structure [JCPDS No. 20-1324].

There are no additional reflections observed in the XRD patterns of AgP—$WO_3$ nanocomposites except for the characteristic reflections of $Ag_3PO_4$ and $WO_3$ crystal structures (FIG. 2A). It could be observed in the figure that with increase of $WO_3$ weight percent in AgP—$WO_3$ nanocomposites, the intensities of $WO_3$ reflections increased, while the intensities of $Ag_3PO_4$ reflections gradually decreased. After Pt deposition, the crystal structure of $WO_3$ was not changed, however the reflections due to bcc structure $Ag_3PO_4$ were almost disappeared and reflections due to face-centered cubic Ag metal particles were appeared in case of bare $Ag_3PO_4$ and AgP—$WO_3$ nanocomposite samples. The transformation of $Ag_3PO_4$ structure during Pt deposition is mainly due to presence of different phytochemicals in *Salvia officinalis* extract. It was previously reported that aqueous extract of *Salvia officinalis* contains several types of phytochemicals such as glycosidic forms of apigenin, luteolin and scutellarin and could effectively reduce the metal precursors into metal particles [32]. It is interesting to note that no reflections due to Pt nanoparticles were observed in all Pt deposited samples. This is possibly due to low Pt loading and high dispersion of small size Pt crystallites. The disappearance of reflections due to $Ag_3PO_4$ structure and appearance of Ag metal particles indicating that the aqueous *Salvia officinalis* extract effectively reducing the $Ag_3PO_4$ into Ag metal particles. It is clear that the aqueous extract of *Salvia officinalis* could not be able to reduce the $WO_3$ particles, as all samples shows the presence of reflections due to $WO_3$ phase.

The morphology of the synthesized samples was investigated using SEM analysis. The obtained SEM images of the representative samples are shown in FIG. 3. The SEM image of bare $Ag_3PO_4$ sample composed of irregular polyhedral crystals with average size of 100-120 nm. The image of sample clearly showing that the surface of $Ag_3PO_4$ crystals is clean, and it is indicating that $Ag_3PO_4$ is not yielding any small Ag metal nanoparticles. After Pt deposition, the sample possessed the same morphology however, the existence of much smaller nanoparticles with size of 20-25 nm on the surface of $Ag_3PO_4$ crystals. As compared to pure $Ag_3PO_4$ crystals, these small nanoparticles could be the reduced Ag and Pt, nanoparticles. The XRD analysis have not shown presence of reflections due to Pt nanoparticles, therefore most of those are Ag nanoparticles. The SEM images of Pt deposited $WO_3$ nanofibers and $Ag_3PO_4$—$WO_3$ composites exhibiting the presence of $WO_3$ nanofibers. The presence of both polyhedral shaped $Ag_3PO_4$ and $WO_3$ nanofibers in the composite samples indicates that the composite formed heterojunction successfully and still inherited the morphology of $Ag_3PO_4$ and $WO_3$ components. However, the surface of both $Ag_3PO_4$ and $WO_3$ are covered by randomly distributed small nanoparticles.

The FT-IR spectra of the Pt deposited synthesized samples are shown in FIG. 4. The spectra of all samples show a broad and strong IR absorption peak around 3400 $cm^{-1}$ which could be assigned to O—H stretching vibration. And the two peaks at 1380 and 1660 $cm^{-1}$ are due to H—O—H bending vibration $H_2O$ molecules [35]. The bare $Ag_3PO_4$ exhibited the absorption peaks at 551 $cm^{-1}$, 862 $cm^{-1}$ and 1020 $cm^{-1}$ which could be assigned to O=P—O bending, P—O—P symmetric and asymmetric stretching vibrations respectively [36]. On other hand, the bare $WO_3$ nanofibers sample shows the IR absorption peaks in the region of 600-900 $cm^{-1}$ originates from the W—O—W bridging vibrations [37]. The peaks at 965 $cm^{-1}$ and 750 $cm^{-1}$ are attributed to the vibrations of W=O bond and stretching of the bridging oxygen O—W—O, respectively. All the representative absorption peaks of $Ag_3PO_4$ and $WO_3$ can be observed in the spectra of the $Ag_3PO_4$—$WO_3$ composite samples. The observed results revealing the above analyses endorse the coordination environment of W and P did not change significantly during the coupling process of $WO_3$ and $Ag_3PO_4$.

The UV-vis light absorption properties of pure and Pt—Ag decorated AgP and $WO_3$ samples were analyzed by DR UV-vis spectroscopy measurements and the results are presented in FIG. 5. The UV-vis absorption spectra of pure AgP and $WO_3$ samples shows that they can absorb both UV and visible light. It is also clear from FIG. 6 that that these samples possessed the band gap energy of 2.5 eV and 2.34 eV respectively. Interestingly, the AgP—$WO_3$ composites exhibited more visible light compared to UV light, as prominent absorption peaks were appeared in the visible region. The lowest band gap energy was observed in case of the sample with 10 wt. % $WO_3$ content (AgP—$WO_3$-2). It is interesting to note that Pt—Ag metals decorated AgP—$WO_3$ samples exhibit marked absorption enhancement in the visible light region, which can be attributed to the surface plasmon resonance (SPR) of Pt and Ag metal nanoparticles formed on the surface of AgP—$WO_3$ composite. The enhancement in light absorption for $M/Ag_3PO_4$ may also support the successful deposition of noble metal nanoparticles on the surface of $Ag_3PO_4$.

TABLE 1

Textural properties of the samples obtained from $N_2$-physisorption experiments.

| S. No. | Catalyst | BET surface area ($m^2g^{-1}$) | Pore volume ($cm^3g^{-1}$) | Pore diameter (Å) |
|---|---|---|---|---|
| 1 | AgP | 12.5 | 0.082 | 30.4 |
| 2 | Pt-Ag/AgP | 9.6 | 0.044 | 29.1 |
| 3 | $WO_3$ | 35.3 | 0.071 | 26.4 |
| 4 | Pt-Ag/$WO_3$ | 13.4 | 0.026 | 26.0 |
| 5 | AgP-$WO_3$(2) | 23.8 | 0.028 | 28.1 |
| 6 | Pt-Ag/AgP-$WO_3$ (2) | 6.8 | 0.018 | 25.6 |

The textural properties of the samples are obtained from the $N_2$ physisorption experiments and the BET surface area pore volume and pore diameter of the samples are provided in Table 1. The S BET values of pure AgP and $WO_3$ samples are 12.5 and 35.3 $m^2 g^{-1}$, respectively, these observed values are much high compared to reported in the literature. This is possibly due to the different preparation conditions used in the present research. The composites of AgP and $WO_3$ exhibited the higher surface area than pure AgP and lower than $WO_3$. However, with increase of $WO_3$ content, an increase surface area, pore volume was observed.

The band gap energy measurements of the synthesized materials indicated that the pure $WO_3$ and AgP samples exhibited bandgap of 2.56 eV and 2.02 eV respectively, while band gap was slightly reduced for the AgP—$WO_3$ composites; thus, the $e^-$-h+ pairs could be generated on the surface of AgP, $WO_3$ and AgP—$WO_3$ composites under visible light irradiation. It was observed that the AgP—$WO_3$ composites exhibited excellent photocatalytic activity for hydrogen production and considerably higher than pure AgP and $WO_3$ catalysts under identical reaction conditions. As expected, the photocatalytic reforming activities of bulk and Pt and Ag decorated AgP—$WO_3$ composites with different weight percent of $WO_3$ are higher compared to non-decorated composites. The pure AgP has conduction band (CB) and valency band (VB) values of and 2.62 eV, respectively. Under the visible light irradiation, $e^-$-$h^+$ pairs are generated on the surfaces of both AgP and $WO_3$. The lower catalytic activity of $WO_3$ compared to AgP is mainly due to the more positive CB potential of $WO_3$, as well as its less absorption of visible light. It was previously reported that the increase in photocatalytic activity of AgP—$WO_3$ composites is mainly due to the highly effective separation of photogenerated $e^-$-$h^+$ pairs. Under visible light irradiation, the photogenerated $e^-$ transfer from VB to the CB of $WO_3$ and then migrate to the VB of AgP to combine with $h^+$. Therefore, the photo-induced $e^-$ and $h^+$ of AgP are separated effectively, and the photogenerated $e^-$ are unceasingly moved to the CB interface of AgP. Thus, a greater number of $e^-$ are gathered on the CB interface of AgP, and more h+ are accumulated in the VB interface of $WO_3$. It was well reported that the noble metal nanoparticles act as an efficient electron trap in order to decrease the $e^-$-h+ recombination rate upon photoexcitation. The adsorbed ethanol molecule converted into the aldehyde after photoenergy absorption as shown in FIG. 7.

The XPS analysis is a well-known technique to analyze the surface chemical state of the elements presented in the synthesized materials. FIGS. 8A-8F show the deconvoluted XPS spectra for representative bulk and Pt deposited AgP, $WO_3$, AgP—$WO_3$ samples. The $Ag_3d$ XPS spectra of all the samples exhibited peaks attributed to $Ag_3d_{5/2}$ and $Ag_3d_{3/2}$, which were fitted to two independent contributions corresponding to $Ag^0$ and $Ag^+$ species [38].

The peaks appeared at 373.5 eV and 367.4 eV could be attributed to $Ag^0$ species, while the peaks at 373.0 eV and 366.7 eV are assigned to $Ag^+$ ions for pure $Ag_3PO_4$ sample [39]. The binding energies of these peaks were shifted slightly in case of composite samples, which could be attributed to the interaction between $Ag_3PO_4$ and $WO_3$ phases. The deconvolution of P 2p spectra of the samples reveals the phosphorous existed in three different states on the surface in case of all the samples. The samples exhibited peaks in the range of 131.7-133.2 eV for P=O, P—O—Ag and P—OH species [40]. The bulk $WO_3$ nanofibers sample exhibited two major contributions corresponding to W $4f_{5/2}$ and W $4f_{7/2}$ at 36.5 eV and 34.5 eV, which is indicating that the most W species are in +6 oxidation state [41]. However, the binding energies of major W $4f_{5/2}$ and W $4f_{7/2}$ contributions are appeared at 37.2 eV and 35.2 eV in case of AgP—$WO_3$ composite and Pt deposited AgP—$WO_3$ samples. The shift in the binding energies to a high position is possibly due to the interaction between $WO_3$ and $Ag_3PO_4$ or Ag species and they are not simply a physical mixture but composited with each other. Similar results were previously observed by the other researchers [42-43].

It is clear from the figure that the O1s spectra are different for bulk $WO_3$, $Ag_3PO_4$, and AgP—$WO_3$ composites. The O1s peak in $WO_3$ can be deconvoluted into two contributions. The major peak at 529.3 eV originated from the W—O bond in the $WO_3$ lattice and the small intensity peak at 530.3 eV corresponding to —OH groups, originated from water molecules [44]. On other hand, the bulk $Ag_3PO_4$ sample exhibited three deconvoluted O1s peaks at 533.2 eV, 531.9 eV, 529.8 eV which could be assigned to oxygen atoms for P—OH, P—O—Ag and P=O species respectively. In addition, it is observed that the O1s spectra for the AgP—$WO_3$ composites and Pt deposited samples are consistent with $WO_3$ and $Ag_3PO_4$, which also revealing the composition of $WO_3$ with $Ag_3PO_4$.

The deconvoluted Pt 4f spectra for Pt deposited samples also presented in the FIG. 7. It is possible to distinguish the difference between the surface Pt (0), Pt (II) and Pt (IV) species presented in samples based on the binding energies of the peaks [45]. Presence of XPS peaks at 72.1 eV, 74.1 eV and 76.1 eV indicating that the Pt—AgP sample composed of both metal and oxidized Pt ($Pt^{2+}$ & $Pt^{4+}$) species [46]. Similar peaks were observed in case of Pt—$WO_3$ and Pt—AgP—$WO_3$ samples, however peaks were observed at higher binding energies, which indicates that the interaction of Pt is different with $WO_3$ and AgP—$WO_3$ composite compared with bulk AgP. The intensity of peaks corresponding to surface species is different, therefore determination of the concentration of surface species different.

The surface Ag/P, O/Ag, and O/P atomic ratios for the samples were calculated using the XPS data. The Ag/P atomic ratio for AgP sample is 2.39 is more compared to Pt—AgP (2.35). The Ag/P atomic ratio in Pt—AgP—$WO_3$ composite is around 2.44 stayed higher compared to the Pt—AgP indicating that the Pt—AgP—$WO_3$ has a higher content of $Ag^0$. The O/Ag atomic ratio in AgP—$WO_3$ sample is lower than that of AgP and $WO_3$ samples indicating that the oxygen deficiency is more in case of AgP—$WO_3$. In addition, the ratio of O/P after Pt deposition decreased from 3.03 in AgP—$WO_3$ to 2.95 in Pt—AgP—$WO_3$. The generation of $Ag^0$ and $Pt^0$ could have resulted the oxygen vacancy, which could enhance photocatalytic performance of the materials [47].

General Definitions

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount, or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

REFERENCES

[1] United Nations Environment Programme. The hydrogen economy, a non-technical review. 2006.
[2] J. A. Turner, *Science*, 305 (2004) 972.
[3] B. C. R. Ewan, R. W. K. Allen, *Int. J. Hydrogen Energy*, 30 (2005) 809.
[4] S. A. Sherif, F. Barbir, T. N. Veziroglu, *Sol Energy*, 78 (2005) 647.
[5] International Energy Agency. Energy technology essentials for hydrogen production & distribution. 2007.
[6] K. M. Mayer, J. H. Hafner, Chem. Rev. 111 (2011) 3828.
[7] A. B. Tesler, L. Chuntonov, T. Karakouz, T. A. Bendikov, G. Haran, A. Vaskevich, I. Rubinstein, J. Phys. Chem. C 115 (2011) 24642.
[8] M. Svedendahl, S. Chen, M. Kali, In: Nanoplasmonic Sensors, Dmitriev, A., Ed. Springer New York: New York, NY, 2012; pp 1-26.
[9] X. Chen, L. Liu, P. Y. Yu, S. S. Mao, Science 331 (2011) 746-750.
[10] Wang, H.; Zhang, L.; Chen, Z.; Hu, J.; Li, S.; Wang, Z.; Liu, J.; Wang, X. Chem. Soc. Rev., 43, 5234-5244.
[11] Jang, J. S.; Kim, H. G.; Lee, J. S. Catal. Today, 185, 270-277.
[12] Journal of Energy Chemistry, 2021, 56, 162-170.
[13] J. S. Lu, Y. J. Wang, F. Liu, L. Zhang, S. N. Chai, Appl. Surf. Sci., 2017, 393, 180-190.
[14] H. Xu, H. Z. Zhao, Y. G. Xu, Z. G. Chen, L. Y. Huang, Y. P. Li, Y. H. Song, Q. Zhang, H. M. Li, Ceram. Int., 2016, 42, 1392-1398.
[15] Y. Chang, K. Yu, C. X. Zhang, R. Li, P. Y. Zhao, L. L. Lou, S. X. Liu, Appl. Catal., B, 2015, 176, 363-373.
[16] Y. Y. Bu, Z. Y. Chen, C. J. Su, Appl. Catal., B, 2015, 179, 363-371.
[17] L. Cai, X. L. Xiong, N. G. Liang, Q. Y. Long, Appl. Surf. Sci., 2015, 353, 939-948.
[18] Li, H.; Zhang, Y.; Zhang, Q.; Wang, Y.; Fan, Y.; Gao, X.; Niu, J. Appl. Surf. Sci. 2019, 490, 481-491.
[19] Lu, J.; Wang, Y.; Liu, F.; Zhang, L.; Chai, S. Appl. Surf. Sci. 2017, 393, 180-190.
[20] Shi, H.; Yang, S.; Han, C.; Niu, Z.; Li, H.; Huang, X.; Ma, J. Solid State Sci. 2019, 96, No. 105967.
[21] S. Zhang, T. Yu, H. Wen, R. Guo, J. Xu, R. Zhong, X. Liac, J. You, RSC Adv., 2020, 10, 16892-16903
[22] Li, X. et al. Chem. Eng. J. 366, 339-357 (2019).
[23] F. Chen, Q. Yang, X. Li, Appl. Catal. B Environ. 200 (2017) 330-342.
[24] L. Tian, X. F. Yang, X. K. Cui, Q. Q. Liu, H. Tang, Appl. Surf. Sci. 463 (2019) 9-7.
[25] X. F. Yang, L. Tain, X. L. Zhao, H. Tang, Q. Q. Liu, G. S. Li, Appl. Catal. B Environ. 244 (2019) 240-249.
[26] L. Tian, X. Z. Xian, X. K. Cui, H. Tang, X. F. Yang, Appl. Surf. Sci. 430 (2018) 301-308.
[27] Y. Chang, K. Yu, C. X. Zhang, Appl. Catal. B Environ. 176-177 (2015) 363-373.
[28] C. Wang, M. Wu, M. Yan, Ceram. Int. 41 (2015) 6784-6792.
[29] B. G. Lu, X. D. Li, T. H. Wang, E. Q. Xie, Z. Xu, J. Mater. Chem. 1 (2013) 3900.
[30] B. K. Liu, D. J. Wang, T. F. Xie, ACS Catal. 4 (2014) 3724-3729.
[31] J. Jia, K. Taniyama, M. Imura, T. Kanai, Y. Shigesato, Phys. Chem. Chem. Phys. 19 (2017) 17342-17348.
[32] J. B. Cal, X. Q. Wu, S. X. Li, F. Y. Zheng, ACS Sustain. Chem. Eng. 4 (2016) 1581-1590.
[33] Y. Bu, Z. Chen, C. Sun, Appl. Catal. B Environ. 179 (2015) 363-371.
[34] X. Zeng, Z. Wang, G. Wang, T. R. Gengenbach, D. T. McCarthy, A. Deletic, J. Yu, X. Zhang, Appl. Catal. B Environ. 218 (2017) 163-173.
[35] J. Ma, J. Zou, L. Li, C. Yao, T. Zhang, D. Li, Appl. Catal., B, 2013,134-135, 1-6.
[36] L. F. Lopes, F. M. Pontes, L. O. Garcia, D. S. L. Pontes, D. Padovani, A. J. Chiquito, S. R. Teixeira, Y. N. Colmenares, V. R. Mastelaro and E. Longo, J. Alloys Compd., 2018,736, 143-151.
[37] B. Chai, J. Li and Q. Xu, Ind. Eng. Chem. Res., 2014, 53, 8744-8752, DOI:
[38] J. Zhang, K. Yu, Y. Yu, L. L. Lou, Z. Yang, J. Yang, S. Liu, J. Mol. Catal. A: Chem., 2014, 391, 12-18.
[39] P. Dong, G. Hou, C. Liu, X. Zhang, H. Tian, F. Xu, X. Xi, R. Shao, Materials, 2016, 9, 968, https://doi.org/10.3390/ma9120968.
[40] H. Xu, H. Zhao, Y. Xu, Z. Chen, L. Huang, Y. Li, Y. Song, Q. Zhang, H. Li, Ceram. Int., 2016, 42, 1392-1398.
[41] T. Hu, P. Li, J. Zhang, C. Liang, K. Dai, Appl. Surf. Sci., 2018, 442, 20-29.
[42] Z. Li, X. Wang, J. Zhang, C. Liang, L. Lu, K. Dai, Chin. J. Catal., 2019, 40, 326-334.
[43] H. Zhang, G. Wang, D. Chen, X. J. Lv, J. H. Li, Chem. Mater., 2008, 20, 6543-6549.
[44] Y. Bi, H. Hu, S. Ouyang, Z. Jiao, G. Lu, J. Ye, J. Mater. Chem., 2012, 22, 14847-14850.
[45] A. Alshehri, K. Narasimharao, J. Mater. Res. Tech., 2020, 9, 14907-14921.
[46] K. Siuzdak, M. Sawczak, M. Klein, G. Nowaczyk, S. Jurga, A. Cenian., Phys. Chem. Chem. Phys., 2014, 16, 15199-15206.
[47] Y. Chang, K. Yu, C. Zhang, R. Li, P. Zhao, L. Lou, S. Liu, Appl. Catal. B., 2015, 176-177, 363-373.

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

Although the foregoing subject matter has been described in some detail by way of illustration and example for purposes of clarity of understanding, it will be understood by those skilled in the art that certain changes and modifications can be practiced within the scope of the appended claims.

The invention claimed is:

1. Crystalline $Ag_3PO_4$—$WO_3$ composite nanofibers comprising 5 to 15 wt. % $WO_3$, wherein the composite nanofibers are visible light active photo catalysts.

2. The composite nanofibers of claim 1, produced by a process comprising the steps of:
   a) synthesizing crystalline $Ag_3PO_4$ powder via microwave synthesis method;
   b) synthesizing crystalline $WO_3$ nanofibers via electrospinning method; and
   c) dispersing the crystalline $Ag_3PO_4$ and the crystalline $WO_3$ in a solution of alcohol and water and synthesizing $Ag_3PO_4/WO_3$ composite nanofibers via ultrasonication homogenization.

3. The composite nanofibers of claim 1, further comprising metal nanoparticles on a surface of the composite nanofibers.

4. The composite nanofibers of claim 3, wherein the metal nanoparticles are decorated with a plant extract comprising bioactive agents capable of preventing the metal nanoparticles from aggregating in an aqueous medium and/or capable of reducing the metal nanoparticles.

5. The composite nanofibers of claim 4, wherein the plant extract is derived from *Salvia officinalis*.

6. The composite nanofibers of claim 5, wherein the metal nanoparticles comprise Pt and/or Ag metals.

7. The composite nanofibers of claim 6, wherein the composite nanofibers have:
   i) a lower band gap relative to $WO_3$ and/or AgP;
   ii) a higher surface area relative to $WO_3$ and/or AgP; and/or
   iii) improved photocatalytic activity for $H_2$ production from bioethanol relative to $WO_3$ and/or AgP.

8. A process for making crystalline $Ag_3PO_4$—$WO_3$ composite nanofibers, the process comprising the steps of:
   a) synthesizing crystalline $Ag_3PO_4$ powder via microwave synthesis;
   b) synthesizing crystalline $WO_3$ nanofibers via electrospinning; and
   c) dispersing the crystalline $Ag_3PO_4$ and the crystalline $WO_3$ in a solution of alcohol and water and synthesizing $Ag_3PO_4/WO_3$ composite nanofibers via ultrasonication homogenization;
wherein the composite nanofibers comprise 5 to 15 wt. % $WO_3$ and are visible light active photo catalysts.

9. The process of claim 8, further wherein the composite nanofibers comprise metal nanoparticles on a surface of the composite nanofibers.

10. The process of claim 9, wherein the metal nanoparticles are decorated with a plant extract comprising bioactive agents capable of preventing the metal nanoparticles from aggregating in an aqueous medium and/or capable of reducing the metal nanoparticles.

11. The process of claim 10, wherein the plant extract is derived from *Salvia officinalis*.

12. The process of claim 11, wherein the metal nanoparticles comprise Pt and/or Ag metals.

13. The process of claim 12, wherein the composite nanofibers have:
   i) a lower band gap relative to $WO_3$ and/or AgP;
   ii) a higher surface area relative to $WO_3$ and/or AgP; and/or
   iii) improved photocatalytic activity for $H_2$ production from bioethanol relative to $WO_3$ and/or AgP.

* * * * *